US012582089B1

(12) United States Patent
Laske et al.

(10) Patent No.: US 12,582,089 B1
(45) Date of Patent: Mar. 24, 2026

(54) PET HEADREST FOR VEHICLE

(71) Applicant: SafetyFurst LLC, Los Angeles, CA (US)

(72) Inventors: Andrew Laske, Los Angeles, CA (US); Brian Gant, Los Angeles, CA (US)

(73) Assignee: SafetyFurst L.L.C, Warrenton, MO (US)

( * ) Notice: Subject to any disclaimer, the term of this patent is extended or adjusted under 35 U.S.C. 154(b) by 0 days.

(21) Appl. No.: 18/968,752

(22) Filed: Dec. 4, 2024

(51) Int. Cl.
*A01K 1/035* (2006.01)

(52) U.S. Cl.
CPC ..................................... *A01K 1/035* (2013.01)

(58) Field of Classification Search
CPC ........ A47D 15/008; B60N 2/80; B60N 2/783; B60N 2/60; F16F 1/36; F16F 1/37; A47G 9/1009; A47G 9/1081; A47C 7/383; A47C 7/54; B60R 21/055
USPC ............ 119/28.5; 5/424; 297/392, 399, 220; 248/118, 118.1
See application file for complete search history.

(56) References Cited

U.S. PATENT DOCUMENTS

| | | | | |
|---|---|---|---|---|
| 3,046,573 A | * | 7/1962 | Davis, Sr. ............... | B60N 2/787 |
| | | | | 5/652 |
| 4,214,326 A | * | 7/1980 | Spann ................... | A47C 20/027 |
| | | | | 5/632 |
| 4,860,689 A | * | 8/1989 | Stewart ................ | A01K 1/0353 |
| | | | | 119/28.5 |
| 5,048,892 A | * | 9/1991 | Ledbetter ................. | A47C 5/06 |
| | | | | 5/663 |
| 5,700,053 A | * | 12/1997 | Downing ............... | A47C 31/11 |
| | | | | 5/663 |
| 5,934,754 A | * | 8/1999 | Raffa ..................... | B60N 2/783 |
| | | | | 297/392 |
| 6,000,365 A | * | 12/1999 | Charnesky ............. | A01K 1/035 |
| | | | | 160/368.1 |
| 6,513,861 B2 | * | 2/2003 | DiGrazia ................. | B60J 11/08 |
| | | | | 296/153 |
| 7,118,096 B2 | * | 10/2006 | Petrozziello .......... | E04H 17/066 |
| | | | | 256/33 |
| 9,554,554 B2 | * | 1/2017 | Hubbard, Jr. .......... | A01K 1/035 |
| D934,513 S | * | 10/2021 | Sellars .......................... | D30/199 |
| 11,793,334 B1 | * | 10/2023 | Chen ...................... | A61H 1/0218 |
| 11,827,174 B2 | * | 11/2023 | Massi ..................... | B60R 21/34 |
| 2008/0000428 A1 | * | 1/2008 | Cody ..................... | A01K 1/035 |
| | | | | 119/28.5 |
| 2009/0211023 A1 | * | 8/2009 | Cocco .................... | A47D 13/06 |
| | | | | 5/424 |
| 2015/0173325 A1 | * | 6/2015 | Burns Baker .......... | B60R 7/046 |
| | | | | 296/1.09 |
| 2015/0182037 A1 | * | 7/2015 | Shlomo ................ | A47D 15/008 |
| | | | | 5/424 |

* cited by examiner

*Primary Examiner* — Zoe Tam Tran
(74) *Attorney, Agent, or Firm* — Crowell & Moring LLP

(57) ABSTRACT

A pet headrest includes a continuous elongate body having a plurality of cavities formed therein. The headrest also includes a slot that extends the length of the body and at least partially intersects each of the cavities. The slot receives a top edge of a vehicle window. The headrest also includes at least one pair of opposing contact surfaces formed internal to the body on either side of the slot. Each pair of opposing contact surfaces contacts the window so as to removably secure the pet headrest to the top edge of the vehicle window via friction.

26 Claims, 4 Drawing Sheets

100

110

152

B-B

100

110

124

154

150

156

140

C-C

100

110

124

144

160

140

PET HEADREST FOR VEHICLE

FIELD OF THE DISCLOSURE

The disclosed embodiments relate generally to pet accessories, and more particularly to pet headrests that are releasably mountable to the top edge of a vehicle window that is partially rolled down.

BACKGROUND OF THE DISCLOSURE

Many pet owners receive great enjoyment from their pets and take their pets with them while driving in their automobiles. Many of these pets, e.g., dogs, receive great enjoyment from riding in automobiles—and particularly from extending their heads out of the window opening while the vehicle is being driven. However, extended periods of this may cause discomfort to the pet resting its head on the top edge of a partially rolled down window and/or the lower portion of the window opening. This is particularly true where the vehicle experiences bumps and other road vibrations.

A pet headrest is therefore proposed which makes the experience of riding in a vehicle more pleasant for a pet— particularly a dog. The pet headrest is configured to be mounted on the top edge of the vehicle window so as to provide cushioned support to a pet resting at least partially thereon. Specifically, in use, the window is rolled almost all the way down so that a few inches of the window extend from the window slot of the door. At this point, the slot of the pet headrest is press fitted over the top edge of the window so that the window is received within the slot, and the contact surfaces frictionally engage opposing side surfaces of the window. The pet headrest may be easily detached from the top edge of the window by grasping the pet headrest and pulling it upwardly from the top edge of the window. The contact surfaces provide enough pressure to resiliently maintain the pet headrest in an attached and operable position at the top edge of the window. However, the pet headrest may also be manually removed from the use position without applying excessive force.

The pet headrest is effective to provide a cushioned support for a pet, e.g., a dog, to rest its head on when riding in the vehicle and extending its head outside of the window opening. The pet headrest improves the pet experience of riding in the vehicle and enables the driver to drive more safely because the pet will be more comfortably situated in the passenger side seat (or other seat). The pet headrest is easily attached to the automobile window for use and easily detached from the automobile window when not in use.

Other features and advantages of the present disclosure will become apparent from the following more detailed description, taken in conjunction with the accompanying drawings, which illustrate, by way of example, the principles of the disclosure.

BRIEF DESCRIPTION OF THE SEVERAL VIEWS OF THE DRAWING(S)

DETAILED DESCRIPTION OF THE PREFERRED EMBODIMENTS

Figures 1, 2, 3, 4:
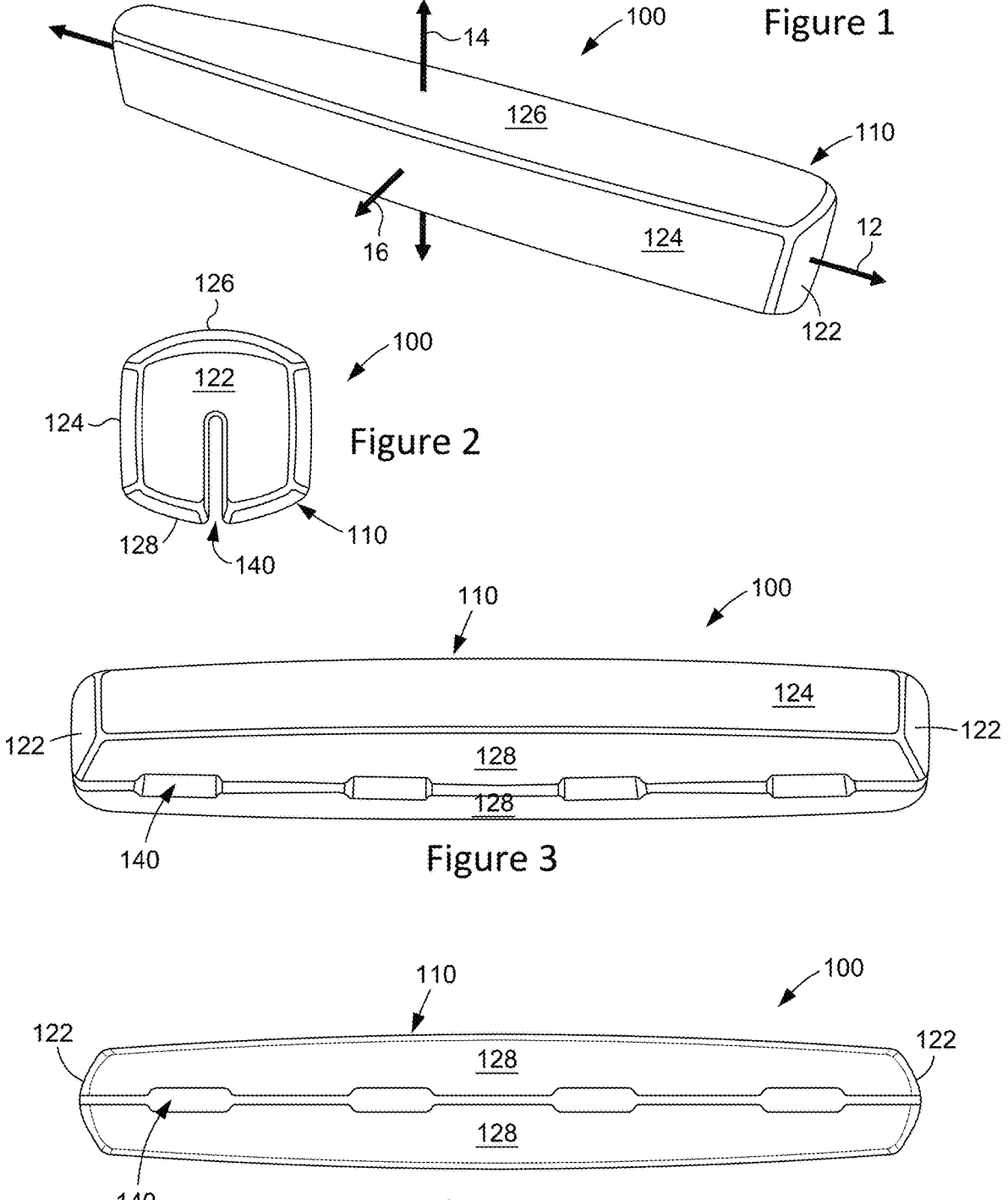
FIG. 1 is a top perspective view of a pet headrest according to at least one embodiment of the disclosure.
FIG. 2 is an end plan view of the pet headrest according to at least one embodiment of the disclosure.
FIG. 3 is a bottom perspective view of the pet headrest according to at least one embodiment of the disclosure.
FIG. 4 is a bottom plan view of the pet headrest according to at least one embodiment of the disclosure.
Figure 5A:
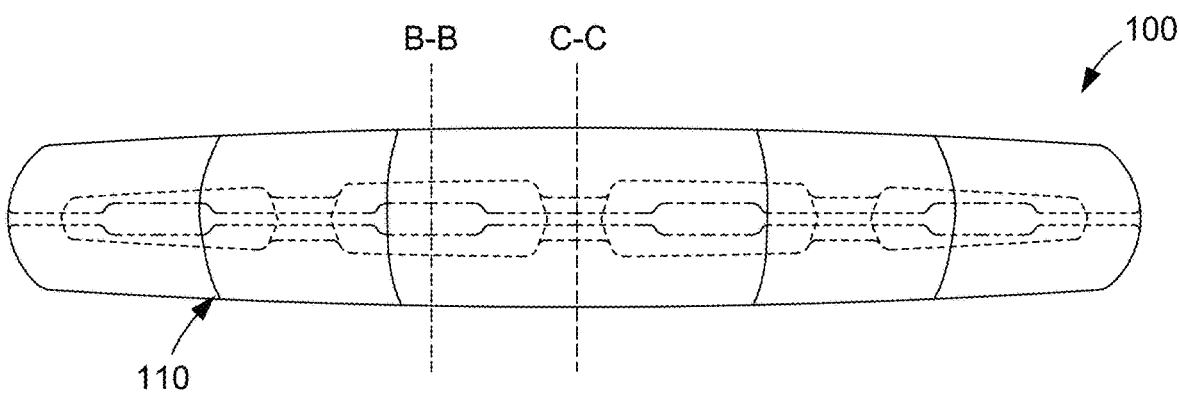
FIG. 5A is a top plan view of the pet headrest showing cavity and channel layout according to at least one embodiment of the disclosure.
Figure 5B:
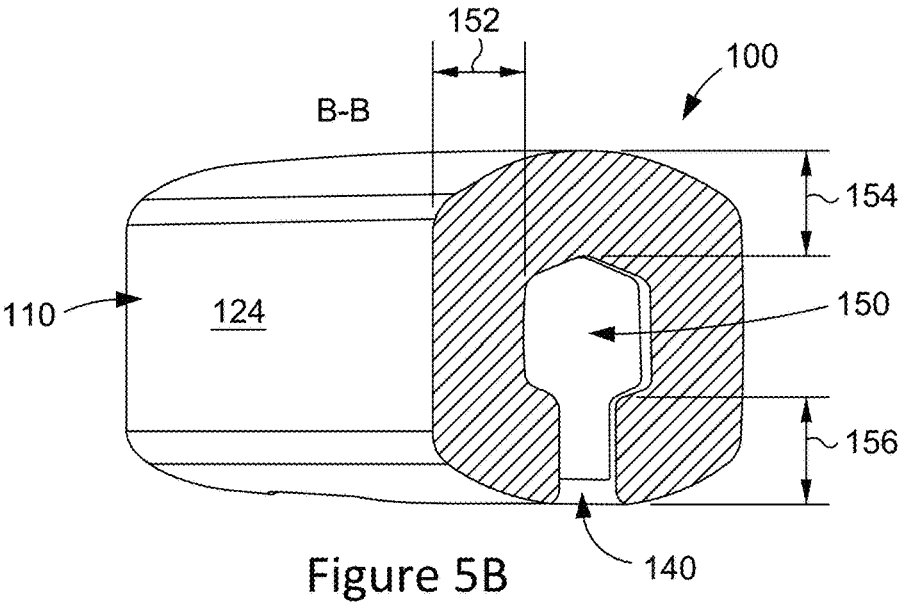
FIG. 5B is a side perspective cross-sectional view of the pet headrest along line B-B of FIG. 5A according to at least one embodiment of the disclosure.
Figure 5C:
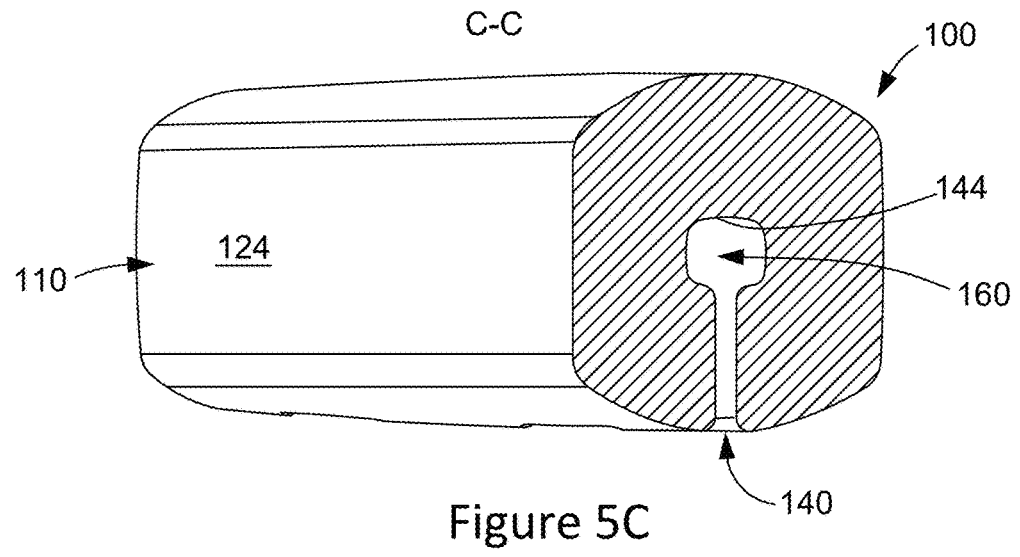
FIG. 5C is a side perspective cross-sectional view of the pet headrest along line C-C of FIG. 5A according to at least one embodiment of the disclosure.

The above described drawing figures illustrate the disclosure in at least one embodiment, which is further defined in detail in the following description. Those having ordinary skill in the art may be able to make alterations and modifications to what is described herein without departing from its spirit and scope. While the disclosure is susceptible of embodiment in many different forms, there is shown in the drawings and will herein be described in detail at least one preferred embodiment with the understanding that the present disclosure is to be considered as an exemplification of the principles discussed herein and is not intended to limit the broad aspect of the disclosure to the embodiments illustrated. Therefore, it should be understood that what is illustrated is set forth only for the purposes of example and should not be taken as a limitation on the scope of the disclosure.

FIGS. 1-10 illustrate a pet headrest 100 for use in a vehicle in accordance with at least one embodiment. In general, the pet headrest is configured to be releasably mountable to a top edge of a side window of an automobile so as to provide a cushioned support for a pet at least partially resting thereon. In particular, the pet headrest 100 may provide such cushioned support for the underside of a dog's chin when the dog extends its head out of the window opening.

The pet headrest 100 generally comprises a generally u-shaped elongate body 120. The body 120 may be formed as a single continuous structure. The body 120 may, for example, be formed via injection molding—in particular, via EVA injection molding.

The body 120 is generally formed of material appropriate for providing the cushioned support for the pet. For example, the body 120 may be formed of ethylene vinyl acetate (EVA), polyurethane (PU), polyethylene (PE), rubber (natural and/or synthetic), thermoplastic polyurethane (TPU), thermoplastic elastomer (TPE), phylon (compressed EVA), polyester foam, viscoelastic foam (memory foam), silicone, nylon, and/or polyvinyl chloride (PVC) material. Other materials may be used to form the body 120 so long as such materials provide the cushioned support.

The body 120 may define a reference coordinate system used herein to describe aspects of the pet headrest 100. The reference coordinate system may include a longitudinal axis 12, a vertical axis 14, and a transverse axis 16. The reference coordinate system is shown, for example, in FIG. 1.

Turning to FIGS. 1-4, the body 120 may termination along the longitudinal axis at opposing end surfaces 122. The end surfaces 122 may be generally oriented along the vertical-transverse plane when compared to other surfaces described herein.

A pair of opposing side surfaces 124 and a top surface 126 extend the length of the body 120 between the opposing end surfaces 122, with the top surface 126 joining the side surfaces 124 as respective top edges 132. The side surfaces 124 may be generally oriented along the longitudinal-vertical plane, and the top surface 126 may be generally oriented along the longitudinal-transverse plane, when compared to the other surfaces described herein.

A bottom surface 128 also extends the length of the body 120 between the opposing end surfaces 122 and opposite the top surface 126. The bottom surface 128 joins to the opposing side surfaces 124 at respective bottom edges 134. The bottom surface 128 may be generally oriented along the longitudinal-transverse plane when compared to the other surfaces described herein.

In some embodiments, the various surfaces of the body 120 may curviplanar and/or may be tapered in ergonomic and/or aerodynamic fashion. The side surfaces 124 may be generally tapered towards either or both of the end surfaces 122. The top surface 126 may be generally tapered towards either or both of the end surfaces 122. The top surface 126 may be generally tapered towards either or both of the side surfaces 124. The bottom surface 128 may be generally tapered towards either or both of the side surfaces 124.

The body 120 is preferably sized to accommodate standard vehicle windows. For example, the body 120 may have a longitudinal length of 6.0 to 50.0 inches, a vertical height of 0.25 to 6.0 inches, and a transverse length of 0.25 to 6.0 inches. Exemplary dimensions are shown, for example, in FIGS. 8-10.

Turning to FIGS. 2-4, the body 120 includes at least one longitudinal slot 140 opening configured to receive the top edge of the window therein. The slot 140 extends into the body 120 at the bottom surface 128 and generally bisects the bottom surface 128. The slot 140 also extends generally along the longitudinal-vertical plane through each of the end surfaces 122. The slot 140 may have a transverse width of 0.05 to 0.25 inches. Exemplary dimensions are shown, for example, in FIG. 8.

Figure 6A:
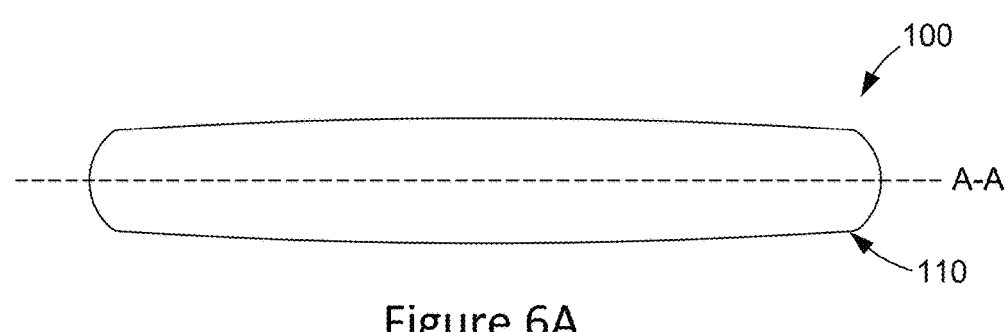
FIG. 6A is a top plan view of the pet headrest according to at least one embodiment of the disclosure.
Figure 6B:
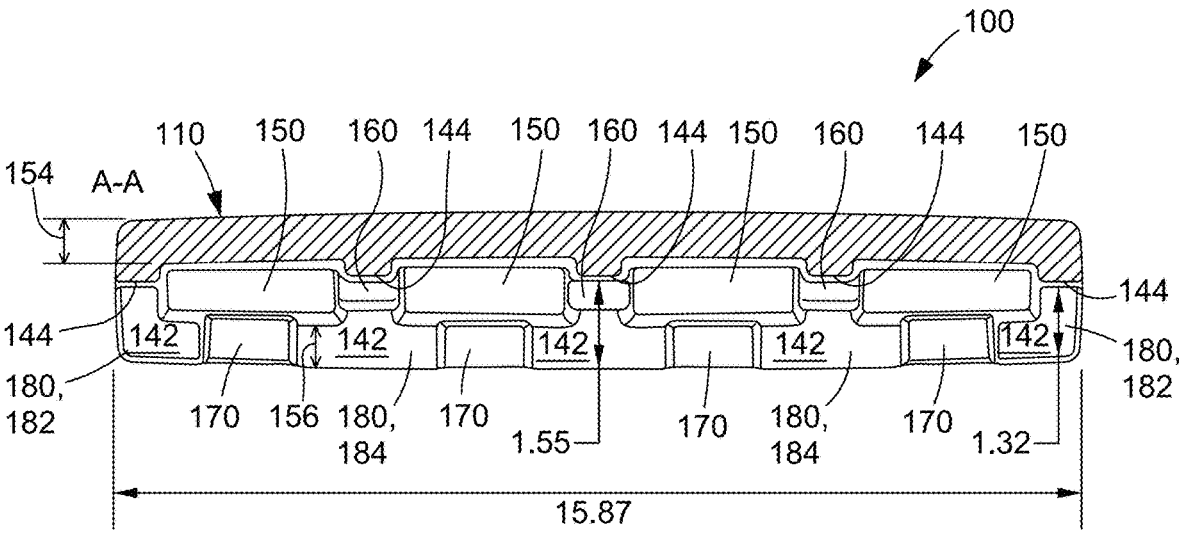
FIG. 6B is a side plan cross-sectional view of the pet headrest along line A-A of FIG. 6A according to at least one embodiment of the disclosure.
Figure 7:
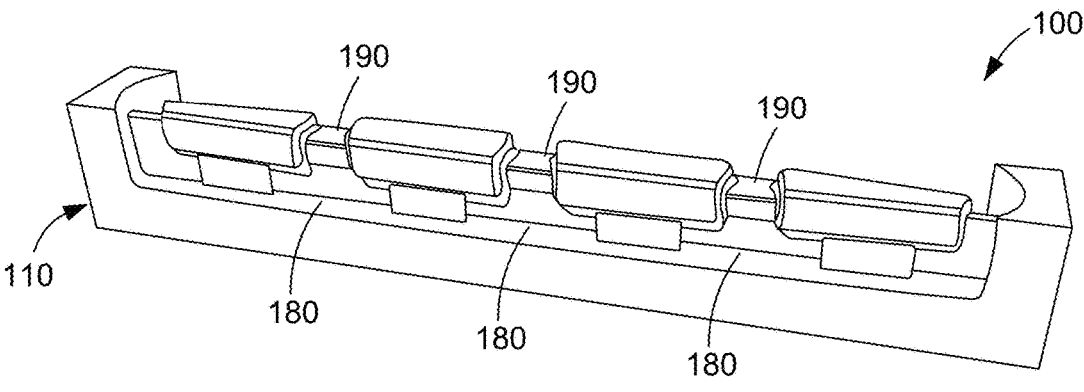
FIG. 7 is a top perspective cut-away view of the pet headrest showing exemplary ribs and ridges according to at least one embodiment of the disclosure.
Figure 8:
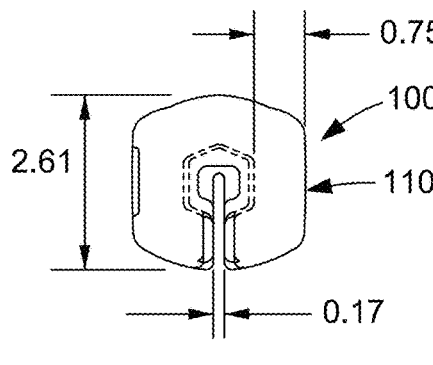
FIG. 8 is an end plan schematic view of the pet headrest according to at least one embodiment of the disclosure.
Figure 9:
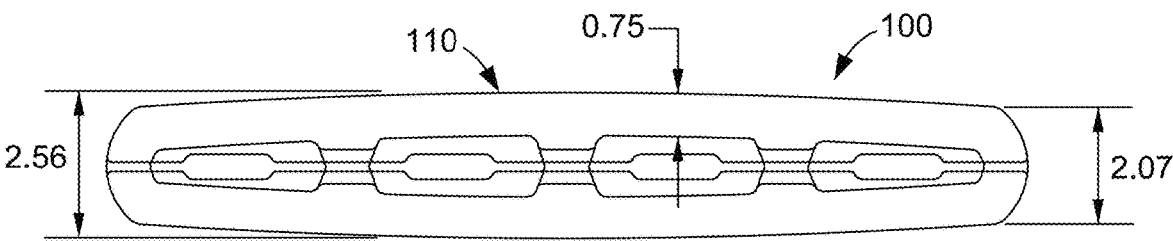
FIG. 9 is a bottom plan schematic view of the pet headrest according to at least one embodiment of the disclosure.
Figure 10:
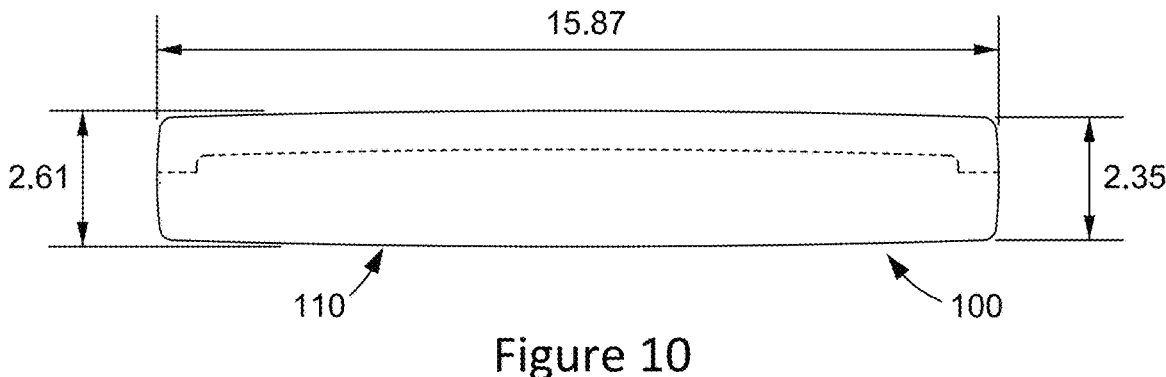
FIG. 10 is a side plan schematic view of the pet headrest according to at least one embodiment of the disclosure.

Turning now to FIGS. 6A-6B, the pet headrest 100 may also include one or more pairs of opposing contact surfaces 142 formed in the body 120 on either side of the slot 140 with respect to the transverse axis. The contact surfaces 142 are generally planar surfaces oriented along the longitudinal-vertical plane. The contact surfaces 142 are generally configured such that, when the window is inserted into the slot 140, each pair of opposing contact surfaces 142 is in contact with the window so as to sandwich the window therebetween.

In operation, the contact surfaces 142 frictionally secure the pet headrest 100 to the top edge of the window. The friction provided by the contact surfaces 142 is preferably sufficient to resist removal of the pet headrest 100 due to forces generated by normal vehicle operation (e.g., lift forces due to vehicular travel, etc.). The friction provided by the contact surfaces 142 is also preferably no so great as to preclude the manual removal of the pet headrest 100 from the window via a user gripping the headrest 100 and pulling the pet headrest 100 up and away from the top edge of the window.

The pet headrest 100 may also include at least one stop surface 144 formed within the body 120 and configured to come into normal contact with the top edge of the window when the window is fully inserted into the slot 140. In operation, the stop surface 144 prevents the window from being further inserted into the body 120 and supports the pet headrest 100 on the top edge of the window.

The stop surface 144 may be a planar or curviplanar surface internal to the body 120 that is oriented generally along the longitudinal-transverse plane. The stop surface 144 may be located within the body 120 at a distance of 0.25 to 5.0 inches from the bottom surface 128. Exemplary dimensions are shown, for example, in FIG. 6B.

As shown in FIG. 6B, in at least one embodiment, the pet headrest 100 includes a plurality of stop surfaces 144. For example, the body 120 may include five top surfaces.

Turning now to FIGS. 5A-5C and 6A-6B, the pet headrest 100 may include a plurality of cavities 150 formed internal to the body 120. Each of the cavities 150 may generally define a negative space that at least partially overlaps with the slot 140. The use of the cavities 150 reduces the amount of material required to form the body 120 while still retaining the ability to be injection molded.

In some embodiments, the cavities 150 are generally symmetric about a cavity axis that is substantially parallel to—and is preferably coaxial with—the longitudinal axis. In other words, the cross-sectional shape of the cavity 150 along the transverse-vertical plane may be axially symmetric shapes as well as regular polygons (e.g., squares, hexagons, etc.). An exemplary cross-section is shown, for example, in FIG. 5B.

As shown in FIG. 6B, in at least one embodiment the pet headrest 100 includes at least two outer cavities 150 and at least one inner cavity 150. Each outer cavity 150 may be formed at opposite longitudinal ends of the body 120. Each inner cavity 150 may be formed longitudinally between the outer cavities 150.

The cavities 150 may be generally conical and/or cylindrical with respect to the longitudinal direction. That is the cross-sectional shape of the cavities 150 along the transverse-vertical plane may be axially conical and/or cylindrical as well as regular polygonal. It will be further understood that the cavities 150 need not all be uniformly shaped, but that cavities 150 may be shaped differently from each other. For example, as shown in FIG. 6B, the two outer cavities 150 are more sharply conical than the two inner cavities 150.

In some embodiments, the cavities 150 are formed within the body 120 at a distance of 0.125 to 3.0 inches from the bottom surface 128, a distance of 0.125 to 3.0 inches from the top surface 126, and a distance of 0.125 to 3.0 inches from either side surface 124. The outer cavities 150 may be formed a distance of 0.125 to 3.0 inches from the nearest end surface 122. The cavities 150 may also be formed with a radial distance of 0.0 to 3.0 inches from the cavity axis.

The cavities 150 and the various exterior surfaces of the body 120 may generally delimit walls of the body 120 having respective minimum wall thicknesses. In some embodiments, the minimum wall thickness is generally consistent. This allows for uniform expansion during the injection molding formation of the body 120.

The cavities 150 and the opposing side surfaces 124 may delimit respective side walls 152. Each side wall 152 may have a minimum side wall thickness—as measured along the transverse axis from the cavity 150 to the respective side surface 124. The minimum side wall thickness may be consistent for each cavity 150. The minimum side wall thickness may be from 0.125 to 3.0 inches.

The cavities 150 and the top surface 126 may delimit a top wall 154. The top wall 154 may have a minimum top wall thickness—as measured along the vertical axis from the cavity 150 to the top surface 126. The minimum top wall thickness may be consistent for each cavity 150. The minimum top wall thickness may be from 0.125 to 3.0 inches.

The cavities 150 and the bottom surface(s) 128 may delimit at least one bottom wall 156. The bottom wall 156 may have a minimum bottom wall thickness—as measured along the vertical axis from the cavity 150 to the bottom surface 128. The minimum bottom wall thickness may be consistent for each cavity 150. The minimum bottom wall thickness may be from 0.125 to 3.0 inches.

Turning now to FIGS. 5A-5B and 6A-6B, the pet headrest 100 may include a plurality of channels 160 formed internal to the body 120. Each channel 160 may generally define a further negative space that at least partially overlaps with the slot 140 and connects adjacent cavities 150. In some embodiments, the channels 160 are generally symmetric about a channel axis that is substantially parallel to—and is preferably coaxial with—the longitudinal axis. In other words, the cross-sectional shape of the channel 160 along the transverse-vertical plane may be axially symmetric shapes as well as regular polygons (e.g., squares, hexagons, etc.). An exemplary cross-section is shown, for example, in FIG. 5C.

In some embodiments, the channels 160 are formed within the body 120 at a distance of 0.125 to 3.0 inches from the bottom surface 128, a distance of 0.125 to 3.0 inches from the top surface 126, and a distance of 0.125 to 3.0 inches from either side surface 124. The channels 160 may also be formed with a radial distance of 0.0 to 3.0 inches from the channel axis.

Turning now to FIGS. 5A-5B and 6A-6B, the pet headrest 100 may include a plurality of outlets 170 formed internal to the body 120. Each outlet 170 may generally define a still further negative space that at least partially overlaps with the slot 140 and connects an associated cavity 150 to the exterior environment of the pet headrest 100. In some embodiments, each outlet 170 may separate adjacent contact surfaces 142 in the longitudinal direction. The outlet 170 may extend transversely within the body 120 further than the slot 140.

In some embodiments, the outlets 170 are formed within the body 120 at a distance of 0.25 to 5.5 inches from the top surface 126 and a distance of 0.25 to 5.5 inches from either side surface 124.

Turning now to FIGS. 5A-5B and 6A-6B, the pet headrest 100 may include at least one rib 180 formed internal to the body 120. Each rib 180 may be generally configured to provide structural support to the body 120 adjacent the slot 140. In particular, due at least partially to the injection molding to form the body 120, the cavities 150 may not be structurally sufficient to allow the body 120 to provide the cushioning support. The ribs 180 function to structurally reinforce the body 120 at the cavities 150. Each rib 180 may constitute a portion of the body 120 where at least one of: the top wall 154, the side walls 152, and the bottom wall 156, is thicker than the respective minimum wall thicknesses.

The body 120 may include one or more end ribs 182 formed at respective ends of the body 120. At the end rib 182, the thickness of the side walls 152 and the thickness of the top wall 154 may be greater than the minimum side wall thickness and the minimum top wall thickness, respectively.

In some embodiments, the end ribs 182 form respective pairs of contact surfaces 142 and/or respective stop surfaces 144.

The body 120 may include at least one intermediate rib 184 formed in the body 120 between adjacent outlets 170. At the intermediate ribs 184, the thickness of the side walls 152 and the thickness of the bottom wall 156 may be greater than the minimum side wall thickness and the minimum bottom wall thickness, respectively. In some embodiments, the intermediate ribs 184 may form respective pairs of contact surfaces 142.

The body 120 may include one or more channel ridges 190 formed in the body 120 each at a respective channel 160. Each channel ridge 190 may be associated with a respective channel 160 and generally configured to provide structural support to the body 120 adjacent the respective channel 160. In particular, due at least partially to the injection molding to form the body 120, the cavities 150 may not be structurally sufficient to allow the body 120 to provide the cushioning support. The channel ridges 190 function to structurally reinforce the body 120 at the cavities 150.

At the channel ridges 190, the thickness of at least one of: the top wall 154, the side walls 152, and the bottom wall 156 is thicker than the respective minimum wall thickness. Accordingly, due to the channel ridges 190, each channel 160 may be smaller than its associated cavities 150 as measured radially from the channel axis and/or the cavity axes. In at least one embodiment, at the channel ridges 190, all of: the top wall 154, the side walls 152, and the bottom wall 156 are thicker than the respective minimum wall thickness.

In operation, the pet headrest 100 is configured to be mounted on the top edge of the vehicle window so as to provide cushioned support to a pet resting at least partially thereon. Specifically, in use, the window is rolled almost all the way down so that a few inches of the window extend from the window slot 140 of the door. At this point, the slot 140 of the pet headrest 100 is press fitted over the top edge of the window so that the window is received within the slot 140, and the contact surfaces 142 frictionally engage opposing side surfaces of the window. The pet headrest 100 may be easily detached from the top edge of the window by grasping the pet headrest 100 and pulling it upwardly from the top edge of the window. The contact surfaces 142 provide enough pressure to resiliently maintain the pet headrest 100 in an attached and operable position at the top edge of the window. However, the pet headrest 100 may also be manually removed from the use position without applying excessive force.

It can therefore be seen that the pet headrest 100 is effective to provide a cushioned support for a pet, e.g., a dog, to rest its head on when riding in the vehicle and extending its head outside of the window opening. The pet headrest 100 improves the pet experience of riding in the vehicle and enables the driver to drive more safely because the pet will be more comfortably situated in the passenger side seat. The pet headrest 100 is easily attached to the automobile window for use and easily detached from the automobile window when not in use.

The embodiments described in detail herein are thus considered novel over the prior art of record and are considered critical to the operation of at least one aspect of the disclosure and to the achievement of its objectives. The words used in this specification to describe the embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A pet headrest, comprising:
a continuous elongate body having a plurality of cavities formed therein;
a slot that extends the length of the body and at least partially intersects each of the cavities, wherein the slot is configured to receive a top edge of a vehicle window;
at least one pair of opposing contact surfaces formed internal to the body on either side of the slot, wherein each pair of opposing contact surfaces is configured to contact the window so as to removably secure the pet headrest to the top edge of the vehicle window via friction; and
a plurality of channels formed internal to the body, wherein each channel connects adjacent cavities and forms a continuous negative space with the slot and the cavities.

2. The pet headrest of claim 1, wherein the friction prevents removal of the headrest from the top edge of the vehicle window due to forces generated by normal vehicle operation.

3. The pet headrest of claim 1, wherein the friction allows for manual removal of the pet headrest from the top edge of the window via a user pulling the headrest upwardly from the top edge of the window.

4. The pet headrest of claim 1, wherein the cavities are generally symmetric about a longitudinal axis of the body so as to provide the body with a generally consistent minimum wall thickness.

5. The pet headrest of claim 1, wherein the slot and the cavities together form a contiguous negative space interior to the body.

6. The pet headrest of claim 1, further comprising:
a plurality of outlets formed internal to the body, wherein each outlet connects a respective cavity of the plurality of cavities to the exterior of the body and forms a contiguous negative space with the slot and the channels.

7. The pet headrest of claim 1, further comprising:
a plurality of ribs formed of the body and configured to structurally support the body adjacent the slot.

8. The pet headrest of claim 7, wherein the plurality of ribs comprises an end rib at each opposing end of the body.

9. The pet headrest of claim 8, wherein the plurality of ribs comprises an intermediate rib at located longitudinally between the end ribs.

10. The pet headrest of claim 8, wherein the ribs at least partially comprise the contact surfaces.

11. The pet headrest of claim 1, further comprising:
a plurality of outlets formed internal to the body, wherein each outlet connects a respective cavity of the plurality of cavities to the exterior of the body and forms a contiguous negative space with the slot and the channels; and
a plurality of ribs formed of the body and configured to structurally support the body adjacent the slot, wherein the plurality of ribs comprises an intermediate rib at located between adjacent outlets.

12. The pet headrest of claim 1, further comprising:
a plurality of channels formed internal to the body, wherein each channel connects adjacent cavities and forms a continuous negative space with the slot and the cavities; and
a plurality of channel ridges formed of the body at the channels and configured to structurally support the body adjacent the cavities.

13. The pet headrest of claim 1, further comprising:
at least one stop surface formed internal to the body and configured to come into normal contact with the top edge of the window so as to prevent the window from being further inserted into the body and to support the body thereon.

14. A pet headrest, comprising:
a continuous elongate body having a plurality of cavities formed therein;
a slot that extends the length of the body and at least partially intersects each of the cavities, wherein the slot is configured to receive a top edge of a vehicle window;
at least one pair of opposing contact surfaces formed internal to the body on either side of the slot, wherein each pair of opposing contact surfaces is configured to contact the window so as to removably secure the pet headrest to the top edge of the vehicle window via friction; and
a plurality of outlets formed internal to the body, wherein each outlet connects a respective cavity of the plurality of cavities to the exterior of the body and forms a contiguous negative space with the slot and the channels.

15. The pet headrest of claim 14, wherein the friction prevents removal of the headrest from the top edge of the vehicle window due to forces generated by normal vehicle operation.

16. The pet headrest of claim 14, wherein the friction allows for manual removal of the pet headrest from the top edge of the window via a user pulling the headrest upwardly from the top edge of the window.

17. The pet headrest of claim 14, wherein the cavities are generally symmetric about a longitudinal axis of the body so as to provide the body with a generally consistent minimum wall thickness.

18. The pet headrest of claim 14, wherein the slot and the cavities together form a contiguous negative space interior to the body.

19. The pet headrest of claim 14, further comprising:

a plurality of channels formed internal to the body, wherein each channel connects adjacent cavities and forms a continuous negative space with the slot and the cavities.

20. The pet headrest of claim 1, further comprising:

a plurality of ribs formed of the body and configured to structurally support the body adjacent the slot.

21. The pet headrest of claim 20, wherein the plurality of ribs comprises an end rib at each opposing end of the body.

22. The pet headrest of claim 21 wherein the plurality of ribs comprises an intermediate rib at located longitudinally between the end ribs.

23. The pet headrest of claim 21, wherein the ribs at least partially comprise the contact surfaces.

24. The pet headrest of claim 20, wherein the plurality of ribs comprises an intermediate rib at located between adjacent outlets.

25. The pet headrest of claim 20, further comprising:

a plurality of channels formed internal to the body, wherein each channel connects adjacent cavities and forms a continuous negative space with the slot and the cavities; and a plurality of channel ridges formed of the body at the channels and configured to structurally support the body adjacent the cavities.

26. The pet headrest of claim 10, further comprising:

at least one stop surface formed internal to the body and configured to come into normal contact with the top edge of the window so as to prevent the window from being further inserted into the body and to support the body thereon.

\* \* \* \* \*